Figure 1:
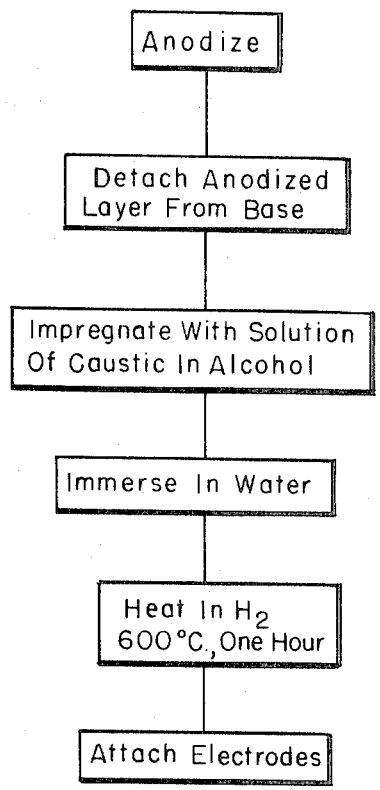

United States Patent

[11] 3,626,233

| [72] | Inventors | Eugene Wainer<br>Shaker Heights;<br>Selwyn H. Rose, Beachwood; Theodore M. Harkulich, Chagrin Falls, all of Ohio |
|---|---|---|
| [21] | Appl. No. | 764,370 |
| [22] | Filed | Sept. 20, 1968 |
| [45] | Patented | Dec. 7, 1971 |
| [73] | Assignee | Horizons Incorporated, a division of Horizons Research Incorporated |

[54] CHANNEL MULTIPLIER OF ALUMINUM OXIDE PRODUCED ANODICALLY
3 Claims, 3 Drawing Figs.

[52] U.S. Cl. .................................................. 313/105, 156/3, 204/45, 29/25.17
[51] Int. Cl. ........................................................ H01j 43/06, H01j 43/22

[50] Field of Search............................................. 313/103, 104, 105

[56] References Cited
UNITED STATES PATENTS

| 2,708,726 | 5/1955 | Atherton...................... | 313/103 |
| 3,244,922 | 4/1966 | Wolfgang...................... | 313/103 X |
| 3,440,470 | 4/1969 | Decker......................... | 313/103 |
| 3,458,745 | 7/1969 | Shoulders..................... | 313/104 |
| 2,898,499 | 8/1959 | Sternglass et al. ............ | 313/105 X |

Primary Examiner—Robert Segal
Attorney—Lawrence I. Field

ABSTRACT: Microchannel plates prepared from anodized aluminum layers etched to increase the pore volume to approximately 50 percent and then treated to exhibit suitable electrical properties for use as a channel plate.

(Holes Enlarged)

(Anodized Plate)

(Holes Enlarged)

INVENTORS
Eugene Wainer
Selwyn H. Rose
Theodore M. Harkulich

BY *Lawrence J. Field*
ATTORNEY

CHANNEL MULTIPLIER OF ALUMINUM OXIDE PRODUCED ANODICALLY

This invention relates to a channel plate and to the method by which said plate is prepared.

As is known in the art, an electron multiplying channel plate is a device having a number of parallel straight sided passages extending completely through the thickness of the plate whereby incident electrons which enter the channels increase in number during the traversal of the channel through the creation of secondary electrons arising from wall collisions. An electrical potential musts, of course, be applied across the plate in order to provide an electron drift velocity down the channel and accelerate the electrons to energies over the first crossover potential. The operation of this structure is described in detail in the *Rev. Sci. Instr.*, 33, 761 (1962). In addition to the requirement that the passages be straight and parallel to one another, another requirement is that the hole area be at least 20 percent of the surface area of said plate and that the ratio of length to channel diameter be in the range 30–150:1.

The present invention is directed to the preparation of such plates by a novel technique in which the pores formed in an anodized surface are controllably processed to yield microchannel plates with the desired geometries. The anodizing of aluminum results in porous coatings in which the pore diameters are reasonably uniform, with the pores extending through the entire surface. The films generally run from a few microns to several mils in thickness. Similar films may be produced by the anodization of titanium, zirconium or tantalum. However, the technology of aluminum anodization is considerably more advanced and hence the present invention will be described with specific reference to aluminum although it is applicable to other metals.

Techniques for anodizing aluminum and aluminum base alloys are well known and are described, for example, in an article appearing in the *Journal of the Electrochemical Society*, 100 No. 9, 441 (Sept. 1953) et seq. and in other publications in the same journal. As described in that article, it is also possible to detach the oxide layer from the aluminum base by an amalgamation technique. The article also describes how various pore sizes are produced in the oxide coating.

Another recent article in the same Journal, Vol. 115, page 618 et seq. describes the cross section of such a detached anodic film. As described in the literature, in order to produce an anodized coating, having the desired perpendicular pores, pure aluminum is made the anode of an acid bath which may be phosphoric, sulfuric, oxalic or sulfamic acid. A solid barrier layer of aluminum oxide is first produced on the surface of the aluminum which grows in accordance with the voltage imposed at the rate of 11 to 14 per bolt applied.

The pore diameters are determined by the electrolyte used and the temperature of operation. Up to about 140 volts the pore-to-pore spacing appears to be determined by voltage used and increases approximately 20 per volt as reported in the 1953 publication. The thickness of the coating produced is a function of temperature, voltage, current density and concentration for a given electrolyte. The thickness increases with increasing current density, voltage and electrolyte concentration and decreases with temperature. An additional variable is the purity of the aluminum with the coating characteristics varying when alloys are used. Thus it is possible to produce porous films to exact structural specifications by rigid control of the operating conditions.

The present invention includes removing, mounting, and modifying these $Al_2O_3$ films to produce channel structures having the geometry required of channel plates. Specifically channel plates have been fabricated using such films after they have been processed to give center-to-center pore spacings of about 0.8 micron, 50 percent open area, and length-to-diameter ratios of about 80 to 1. Such plates have a theoretical resolution exceeding 500 line-pairs/mm.

Figure 2:
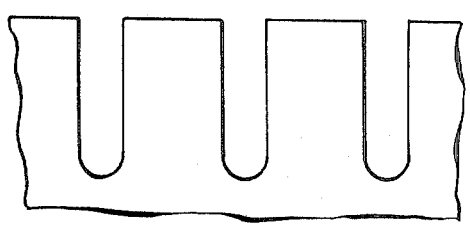
Figure 3:
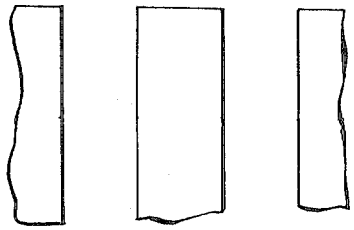

Briefly, the process of the present invention comprises the steps shown schematically in the drawing accompanying this application, FIG. 1 being in the nature of a flow sheet; and FIG. 2 and 3 being schematic fragmentary sections through the channel plate, illustrating the plate configuration of two different stages of its manufacture. The manufacturing process begins with commercially available aluminum foil or sheet of any analyses, alloy 1100 (99 percent +Al.) or alloy 5052 being two alloys which have been used.

Alcoa aluminum foil 5 mil thick 1100 grade 99 percent Al. was anodized using aqueous oxalic acid in concentrations ranging from 0.05 to 3 percent. The lower concentrations have higher electrical resistivity and thus provided for the use of higher applied voltages. The minimum electrode separation used was 6.5 inches since any closer distance reduced the effectiveness of the agitation and cooling. Using maximum (12 inches) electrode separation and a 0.05 to 0.1 percent acid bath, voltages as high as 350 volts were used. Current densities between 15 and 150 amp/ft² were used. This was accomplished by regulating the area of the aluminum sheet which also effected an increase in voltage. In each case a heavy gauge sheet of stainless steel was used as the cathode.

Through use of high current densities, low bath temperatures, and extremely good agitation, thick films with increased center-to-center spacings were prepared, as compared with those in the prior art.

Table I Summarizes the anodizing conditions for producing films with thicknesses of from 10 to 60 microns.

The general appearance of the films was excellent. Examination under the microscope showed them to be clean, crack and hole free, and uniform in nature. The thin films (~10 microns)

TABLE I.—ANODIZING CONDITIONS

| Run | Time (min.) | Bath temp. (° C.) | Oxalic acid conc. (wt. percent) | Voltage, D-C | Current density (amps/ft.²) | Film thickness (microns) |
| --- | --- | --- | --- | --- | --- | --- |
| 1 | 60 | 22 | 3 | 60 | 15 | 10 |
| 2 | 70 | 22 | 3 | 75 | 26 | 20 |
| 3 | 51 | 22 | 3 | 65 | 32.7 | 15 |
| 4 | 20 | 22 | 3 | 65 | 32 | 14.5 |
| 5 | 60 | 22 | 3 | 90 | 67 | 60 |
| 6 | 60 | 4 | 3 | 100 | 28 | 30 |
| 7 | 90 | 4 | 3 | 105 | 27.5 | 20 |
| 8 | 60 | 12 | 3 | 130 | 57 | 50 |
| 9 | 60 | 20 | 3 | 65 | 20 | 28 |
| 10 | 68 | 21 | 3 | 55 | 11.5 | 18 |
| 11 | 60 | 21 | 3 | 80 | 27.5 | 38 |
| 12 | 60 | 22 | 3 | 75 | 44 | 45 |
| 13 | 45 | 22 | 3 | 75 | 72 | 33 |
| 14 | 60 | 23 | 3 | 112 | 56 | 48 |
| 15 | 60 | 22 | 3 | 125 | 28.5 | 16 |
| 16 | 90 | 22 | 3 | 90 | 28 | 41 |
| 17 | 45 | 15 | 3 | 80 | 28 | 36 |
| 18 | 10 | 15 | 1.5 | 135 | 81 | 30 |
| 19 | 10 | 13 | 1.5 | 135 | 78 | 28 |
| 20 | 80 | 14 | 1.5 | 136 | 27 | 41 |
| 21 | 75 | 15 | 1.5 | 148 | 37.5 | 44 |
| 22 | 70 | 15 | 1.5 | 125 | 28 | 50 |
| 23 | 45 | 12 | 1 | 198 | 24 | 42.5 |
| 24 | 20 | 15 | 1 | 124 | 28 | 17.5 |

| Run | Time (min.) | Bath temp. (° C.) | Oxalic acid conc. (wt. percent) | Voltage, D-C | Current density (amps/ft.²) | Film thickness (microns) |
|---|---|---|---|---|---|---|
| 25 | 45 | 12 | 1 | 140 | 25 | 25 |
| 26 [2] | 74 | 12 | 1 | 118 | 28 | |
| 27 | 60 | 15 | 1 | 115 | 28.5 | 30 |
| 28 | 58 | 13 | 1 | 158 | 37.7 | |
| 29 | 28 | 14 | 1 | 157 | 46 | 30 |
| 30 | 40 | 12 | 1 | 140 | 53 | 35 |
| 31 | 60 | 18 | 3 | 132 | 59 | 55 |
| 32 | 82 | 5 | 3 | 135 | 25 | |
| 33 | 40 | 7 | 3 | 131 | 52 | 45 |
| 34 | 25 | 7 | 3 | 125 | 56 | ~30 |
| 35 | 131 | 11 | 3 | 135 | 27 | 65 |
| 36 | 90 | 10 | 3 | 120 | 27 | 45–50 |
| 37 [3] | 30 | 14 | 3 | 120 | 56 | 35–40 |
| 38 [3] | 37 | 15 | 3 | 120 | 56 | 40–42 |
| 39 [3] | 30 | 13 | 3 | 120 | 56 | 32–35 |
| 40 [3] | 40 | 23 | 3 | 117 | 56 | ~50 |
| 41 [3] | 40 | 19 | 2 | 133 | 54 | 42.5 |
| 42 [3] | 40 | 20 | 2 | 120 | 54.5 | 45 |
| 43 [3] | 60 | 14 | 2 | 123 | 28 | 45 |
| 44 [2,3] | 60 | 16 | 2 | 130 | 27 | 50 |
| 45 [3] | 60 | 15 | 2 | 128 | 27.5 | 42.5 |
| 46 | 30 | 19 | 0.1 | 296 | 19.6 | |
| 47 | 70 | 13 | 0.1 | 332 | 20 | 32.5 |
| 48 | 120 | 10 | 0.2 | 314 | 17.5 | 37.5 |
| 49 | 120 | 4 | 0.5 | 246 | 19.6 | 40 |
| 50 | 105 | 6 | 0.5 | 247 | 21.4 | |
| 51 [4] | 120 | 6 | 0.5 | 190 | 19.6 | |
| 52 [4] | 23 | 8 | 0.25 | 200 | 34.2 | |
| 53 [5] | 15 | 8 | 0.25 | 218 | 20 | 12.5 |
| 54 [5] | 52 | 6 | 0.25 | 249 | 20 | 25 |
| 55 | 120 | 3 | 0.25 | 167 | 10 | |
| 56 | 180 | 3 | 0.25 | 155 | 10 | |
| 57 [5] | 33 | 10 | 0.1 | 302 | 19.6 | 125 |
| 58 | 30 | 8 | 0.2 | 270 | 20 | 20 |
| 59 [5] | 120 | 6 | 0.2 | 262 | 11.4 | 37.5 |
| 60 [3,5] | 60 | 4 | 0.2 | 300 | 20 | 25 |
| 61 [3,5] | 75 | 11 | 1 | 165 | 29.2 | 40–60 |
| 62 [3,5] | 90 | 10 | 1 | 167 | 19.3 | 42.5 |
| 63 [5] | 37 | 7 | 0.2 | 250 | 20 | 20 |
| 64 [5] | 120 | 8 | 0.2 | 257 | 20 | 32–37 |
| 65 [5] | 94 | 10 | 0.2 | 267 | 20 | 25 |
| 66 [2,5] | 128 | 8 | 0.2 | 319 | 19.6 | 25 |
| 67 [2,5] | 167 | 4 | 0.2 | 330 | 14 | 27.5 |
| 68 [5] | | | 1.5 | | | |
| 69 [5] | 67 | 5 | 0.75 | 227 | 48 | 30.5 |
| 70 [5] | 60 | 5 | 0.05 | 324 | 6 | |
| 71 [5] | 60 | 8 | 0.75 | 323 | 15 | 15.2 |
| 72 [5] | 120 | 8 | 0.1 | 320 | 17 | 20.3 |
| 73 [5] | 60 | 8 | 0.1 | 316 | 17 | 17.8 |
| 74 [5] | 60 | 7 | 0.1 | 322 | 15 | 15.2 |
| 75 [2,5] | 115 | 3 | 0.1 | 345 | 10 | 19 |
| 76 [2,5] | 120 | 7 | 0.25 | 263 | 20 | 27.9 |
| 77 [5] | 60 | 5 | 0.25 | 163 | 40 | |
| 78 [5] | 67 | 4 | 0.25 | 200 | 40 | 38.1 |
| 79 [5] | 110 | 2 | 0.75 | 137 | 13 | 33 |
| 80 [5,6] | 60 | −10 | 0.02 | 395 | 60 | 50 |
| 81 [5,6] | 90 | −15 | 0.015 | 450 | 75 | 40 |
| 82 [5,6] | 120 | −25 | 0.01 | 500 | 90 | 55 |

[1] 50 mil construction grade aluminum.
[2] 5052 alloy.
[3] Titanium potassium oxalate in bath.
[4] Back side covered with aluminum foil.
[5] Back side covered with masking tape.
[6] Water-ethylene glycol media.

were transparent with a slight tint of gold color. As the thickness increased the films become less transparent and the gold coloring becomes deeper, with very thick films (60 microns) having brown coloring. The color is due to small traces of iron in the alloy and the bath. High voltage films (above 150 volts) had a grayish coloring.

In one aspect of the present invention, the anodized film of the prior art is treated to enlarge the pore area by bringing an etchant into contact with the pores along their entire extent while at the same time deferring the action of the etchant until it can be effective along the entire length of the pore so that the taper, if any, is not accentuated by the etching process once it starts.

After the anodizing was completed, the product was cut into smaller pieces for subsequent processing. A circle of the desired diameter was scribed through the anodized layer into the substrate by use of a stylus and template. The anodized sheet was cut into disc that were slightly larger than the scribed circle. These discs were immediately placed in a saturated aqueous solution of $HgCl_2$. The aluminum was slowly dissolved by the solution by reaction with $HgCl_2$ and by amalgamation with the resulting Hg until the circular film floated free. The floating film was removed with a spatulalike tool by raising it under the film and lifting it out of the solution. While on the tool the film was rinsed with water, then washed in a 5 percent nitric acid bath to remove any traces of mercury salts. Finally the film was washed several times in distilled water and placed on a teflon slab to oven dry at 110° C. for at least 1 hour.

The as-formed 10 micron thick channel plates were approximately 5 percent open and and had length-to-diameter ratios of approximately 500. Preliminary tests showed that they were not useful as channel plates in this geometry. It was therefore necessary to etch open the channel plates to increase the open area and to reduce the length-to-diameter ratios for the pores.

It would appear that simple immersion of the channel plates in an etchant for $Al_2O_3$ should result in opening of the channels. Because of diffusion problems, such treatment did not appreciably increase the diameter of the channels in the interior of the channel plate and hence another technique for opening the channel plate and hence another technique for opening the channels had to be devised. It was found that the hole area could be increased to the desired extent by impregnating the channel plate with an etchant that is not reactive under the impregnation conditions. Then the channel plate was removed from the bath of etchant. The etchant was then activated by use of another chemical constituent that is not in itself an etchant but rather serves to catalyze the reaction between the etchant and the $Al_2O_3$ surface.

The pore enlarging etching was accomplished by placing the channel plate in a saturated solution of sodium hydroxide in ethyl alcohol for an hour in order to thoroughly impregnate and fill the pores. Other alkalies including KOH, LiOH, and even organic alkalies such as tetramethylammonium hydroxides or tetraphenylammonium hydroxide may be also utilized. The plate was then removed from the alcoholic solution and placed in distilled water. An immediate reaction took place as evidenced by vigorous bubble formation. The extent of etching was determined by a comparison of the channel plate density before and after etching, typical results being given in Table II and Table III. The etching process results in structures with open areas ranging from approximately 20 to 70 percent depending on conditions.

FIG. 2 is a schematic view showing the cross section of an anodic film after it has been detached from the unanodized base metal, and FIG. 3 shows the same film after it has been subjected to the pore-enlarging etching.

It will be seen that the barrier layer adjacent to and below the bottom of the pores has been removed, part of the removal having taken place while the plate was immersed in alcoholic caustic and the remainder having been removed during the subsequent immersion in water.

The "as produced" channel plates were found to have a bulk resistivity of approximately $2 \times 10^{16}$ ohm-cm. For practical application the channel plates should have output currents near $10^{-7}$ amps. The strip current, determining the upper limit of the output current, must therefore lie in the region of $10^{-5}$ amps which corresponds to a bulk resistivity of approximately $2 \times 10^{12}$ ohm-cm at 1000 volts. It was found that heating the plates in hydrogen at 600° C. for about 1 hour increased substantially the number of plates having strip currents of the desired magnitude. No noticeable reduction appeared to take place below 600° C. After 45 minutes at 600° C, significant reduction had occurred with better results being obtained after 1 hour. Plates so treated for 2 hours were generally too conductive. However it was possible to reoxidize these plates by exposure to air at 600° C. for 30 minutes.

Temperatures between about 550° C. and 700° C. can be used for this step provided the time of treatment is adjusted, higher temperatures requiring shorter times and conversely.

After plates with satisfactory electrical properties had been made, electrodes were attached to the same in the usual way to complete the channel plate.

By the procedure described above, the pores in the originally anodized material have been enlarged from between 200—500 to between 0.2 micron to 0.8 micron, the hole area in the layer has been increased from about 5 percent to 50 percent and is some cases as high as 70 percent, the length-to-diameter ratio has been reduced to about 50–200:1 and, when the higher voltages are utilized the center-to-center spacing of the pores to a range over 0.4 to 1.0 micron.

It will be seen that the etching procedure involves first contacting and filling the pores with an etchant which is carried in a solvent in which it is relatively inert and then is brought into contact with a liquid in which the etchant actively etches the pores. The etchant should be at least as strong as caustic. The preferred etchant is alchoholic caustic, later activated by addition of water.

The channel plates which were prepared by anodizing at from 400–500 volts have channel diameters (after etching to 50 percent open area) on the order of 0.7 to 0.8 micron and range from ratios of length-to-diameter from about 50:1 to 80:1. These channel plates have been operated for long time periods at voltages on the order of 2000 volts. The electron multiplication factors vary from plate to plate but are generally on the order of 100 to 10,000 at 2000 volts.

The electron multiplication at various operating voltages are enhanced by improving the secondary emissive properties of the channel plate. This may be accomplished by several different procedures. The first general procedure consists of incorporating metal ions such as magnesium, beryllium, titanium, manganese, boron, vanadium, silver, zinc, and the like into the anodic stricture. This may be accomplished by utilizing suitable alloys of these metals as the anodizing substrate. The anodized film will then consist in part of these metal oxides interpersed in the aluminum oxide matrix. Alternatively appropriate salts of these metal ions may be added to the anodizing bath. They are then incorporated into the films dur-

TABLE II.—CONTROLLED ETCHING

| Plate Batch No. | Diameter (inch) | Weight (mg.) | | Thickness ($\mu$) | | Density | | Percent density change |
|---|---|---|---|---|---|---|---|---|
| | | Before etching | After etching | Before etching | After etching | Before etching | After etching | |
| 1 | 1 | 9.3 | 5.0 | 10.5 | 9.5 | 1.75 | 1.04 | 41 |
| | 1 | 9.5 | 5.5 | 10.6 | 9.4 | 1.77 | 1.16 | 35 |
| | 1 | 9.7 | 5.7 | 10.5 | 9.5 | 1.78 | 1.18 | 34 |
| 2 | ⅞ | 9.2 | 6.4 | 10.3 | 10.3 | 2.30 | 1.60 | 30 |
| | ⅞ | 9.1 | 7.1 | 10.3 | 10.3 | 2.28 | 1.78 | 22 |
| | ⅞ | 9.1 | 7.5 | 10.3 | 10.2 | 2.30 | 1.90 | 17 |
| | ⅞ | 9.2 | 6.3 | 10.4 | 10.3 | 2.28 | 1.58 | 31 |
| | ⅞ | 9.0 | 6.2 | 10.2 | 10.2 | 2.28 | 1.57 | 31 |
| 3 | ⅞ | 9.1 | 7.7 | 10.2 | 10.0 | 2.30 | 1.98 | 14 |
| | ⅞ | 8.7 | 7.0 | 10.0 | 10.0 | 2.24 | 1.80 | 20 |
| | ⅞ | 8.7 | 7.5 | 10.0 | 10.0 | 2.24 | 1.93 | 14 |

TABLE III.—CONTROLLED ETCHING, THICK PLATES

| Run No. | Anodizing voltage | Diameter (inch) | Weight (mg.) | | Thickness ($\mu$) | | Density | | Percent density change |
|---|---|---|---|---|---|---|---|---|---|
| | | | Before etching | After etching | Before etching | After etching | Before etching | After etching | |
| 19 | 135 | ⅞ | 11.5 | 7.8 | 28.1 | 27.0 | 2.56 | 1.80 | 29.7 |
| | | ⅞ | 11.2 | 7.9 | 28.0 | 27.0 | 2.50 | 1.83 | 26.8 |
| 20 | 136 | ⅞ | 16.9 | 7.7 | 41.0 | 39.0 | 2.57 | 1.24 | 51.7 |
| | | ⅞ | 17.1 | 11.4 | 41.2 | 41.0 | 2.59 | 1.74 | 32.8 |
| 21 | 150 | 9/16 | 19.2 | 7.3 | 43.5 | 43.0 | 2.76 | 1.05 | 62.0 |
| 22 | 125 | 9/16 | 21.3 | 13.8 | 47.5 | 47.0 | 2.8 | 1.83 | 34.6 |
| 36 | 120 | 1 | 64.0 | 26.3 | 42.0 | 37.5 | 3.02 | 1.33 | 56.0 |
| 38 | 120 | 9/16 | 12.6 | 4.2 | 30.0 | 27.5 | 2.62 | 1.05 | 60.0 |
| 45 | 128 | 19/32 | 18.7 | 8.3 | 45.7 | 40.6 | 2.29 | 1.42 | 38.0 |
| 54 | 249 | 19/32 | 10.1 | 2.7 | 25.0 | 15.0 | 2.26 | 0.95 | 58.0 |
| 63 | 250 | 19/32 | 22.2 | 10.8 | 42.5 | 40.0 | 2.42 | 1.50 | 48.8 |
| 64 | 250 | 19/32 | 16.5 | 7.2 | 37.5 | 27.5 | 2.46 | 1.46 | 40.5 |
| 66 | 319 | 19/32 | 11.7 | 5.1 | 25.0 | 20.0 | 2.62 | 1.42 | 45.8 |
| | 319 | 19/32 | 13.3 | 6.6 | 25.0 | 22.5 | 2.97 | 1.64 | 44.6 |
| 67 | 330 | 19/32 | 13.4 | 7.4 | 25.0 | 22.5 | 2.99 | 1.84 | 38.5 |
| 69 | 220 | 19/32 | 16.6 | 9.5 | 30.5 | 30.5 | 3.84 | 1.74 | 43.0 |
| 71 | 323 | 19/32 | 7.5 | 2.8 | 15.2 | 12.7 | 2.76 | 1.23 | 55.5 |
| 72 | 320 | 19/32 | 11.8 | 7.3 | 20.3 | 12.8 | 3.25 | 2.48 | 23.6 |
| 73 | 316 | 19/32 | 10.8 | 2.5 | 17.8 | 12.7 | 3.07 | 1.10 | 64.0 |
| 76 | 260 | 19/32 | 13.8 | 3.5 | 27.9 | 22.5 | 2.77 | 0.85 | 69.0 |
| 78 | 200 | 19/32 | 17.1 | 8.7 | 35.6 | 33.0 | 2.68 | 1.47 | 45.0 | ing the anodizing process.

The second procedure involves coating the channel walls of completely fabricated channel plates with appropriate secondary emitters. This may be accomplished by placing the channel plates in solutions of appropriate metal salts such as the salts of the alkaline and alkaline earth metals, magnesium beryllium or barium salts and then firing the channel plate at elevated temperatures. Alternatively the channel coating may be introduced by vacuum evaporation or by decomposition in situ of appropriate volatile metal compounds followed by firing at elevated temperatures.

These channel plates with enhanced secondary emission exhibit electron multiplication factors ranging from 100 to 10,000 at voltages on the order of 500–1000 volts. At 2000 volts the electron multiplication factors are all well in excess of $10^4$.

We claim:

1. An electrical channel plate comprising a layer of porous aluminum oxide produced anodically and having parallel, straight sided pores extending through said channel plate, said plate being between about 20 and 100 microns thick and having center to center pore spacing of between about 0.3 to 2.0 microns thick and having at least about 20 percent open area, channel diameters between about 0.25 micron and 1.5 microns, the channel diameters and layer thickness being related so that the length-to-diameter ratio of said pores is 300 to 200, the surfaces of said pores being doped to enhance the secondary emissivity of said aluminum oxide so that it exhibits an electron multiplication factor of between 100 and 10,000 at 2000 volts.

2. The channel plate of claim 1 in which the material in said pores includes a compound of a metal selected from the group consisting of alkali metals and alkaline earth metals.

3. The channel plate of claim 1 wherein the channel plate is 50 microns thick, the channel diameters are 0.8 micron and the open area is approximately 50 percent.

* * * * *